United States Patent
McDonald

(10) Patent No.: US 12,310,377 B2
(45) Date of Patent: *May 27, 2025

(54) APPARATUS AND ASSEMBLY FOR THE CLEANING AND COOKING OF SEAFOOD AND CRUSTACEA

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 982 days.

This patent is subject to a terminal disclaimer.

(21) Appl. No.: 17/379,120

(22) Filed: Jul. 19, 2021

(65) Prior Publication Data

US 2021/0386080 A1   Dec. 16, 2021

Related U.S. Application Data

(63) Continuation-in-part of application No. 15/988,651, filed on May 24, 2018, now Pat. No. 11,064,840, which is a continuation-in-part of application No. 14/877,519, filed on Oct. 7, 2015, now Pat. No. 10,456,812, which is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(51) Int. Cl.

| | |
|---|---|
| *A22C 25/00* | (2006.01) |
| *A22C 25/02* | (2006.01) |
| *A22C 25/08* | (2006.01) |
| *A22C 29/00* | (2006.01) |
| *A47J 27/00* | (2006.01) |
| *A47J 36/20* | (2006.01) |
| *A47J 43/24* | (2006.01) |

(52) U.S. Cl.
CPC .............. *A22C 25/02* (2013.01); *A22C 25/08* (2013.01); *A22C 29/00* (2013.01); *A47J 27/002* (2013.01); *A47J 36/20* (2013.01); *A47J 43/24* (2013.01)

(58) Field of Classification Search
CPC ......... A22C 25/02; A22C 25/08; A22C 29/00; A22C 21/0061; A22C 17/08; A47J 27/002; A47J 36/20; A47J 43/24; A01K 97/04
USPC ........................................................ 452/173
See application file for complete search history.

(56) References Cited

U.S. PATENT DOCUMENTS

| | | | |
|---|---|---|---|
| 2,660,754 A | 12/1953 | Roshko | |
| 2,781,544 A | 2/1957 | Skarmetta | |
| 3,958,022 A | 5/1976 | Danesh | |
| 5,129,855 A * | 7/1992 | Bruckert | A22C 25/02 |
| | | | 366/325.92 |

(Continued)

*Primary Examiner* — Richard T Price, Jr.
(74) *Attorney, Agent, or Firm* — Egbert, McDaniel & Swartz, PLLC

(57) ABSTRACT

An assembly for cleaning and cooking seafood or crustacea has a container with an interior volume defined by a wall, a basket removably received in the interior volume of the container, a pipe positioned adjacent to the wall and having a plurality of apertures adapted to direct the flow of water into an interior of the basket, a connector fluidically connected to the pipe, and a pot spaced from the container. The container has a bottom and an upper edge. The basket has a plurality of openings through a wall thereof. The connector has a portion extending outwardly of the wall of the container. The basket is removably received in the pot.

5 Claims, 9 Drawing Sheets

(56) References Cited

U.S. PATENT DOCUMENTS

| | | | | |
|---|---|---|---|---|
| 6,269,737 | B1* | 8/2001 | Rigney | A47J 27/04 99/413 |
| 6,314,869 | B1* | 11/2001 | Bourgeois, Jr. | A47J 37/1271 99/413 |
| 7,087,257 | B1 | 8/2006 | Prestenbach | |
| 9,320,286 | B1* | 4/2016 | McDonald | A22C 17/08 |
| 9,408,412 | B2 | 8/2016 | McDonald | |
| 11,064,707 | B2* | 7/2021 | McDonald | A47J 44/00 |
| 11,871,759 | B1* | 1/2024 | Eskins | A22C 29/021 |
| 2011/0319002 | A1* | 12/2011 | Myers | A22C 29/043 452/6 |
| 2013/0093107 | A1 | 4/2013 | Funderburg | |
| 2014/0127986 | A1 | 5/2014 | Cady | |
| 2016/0255984 | A1* | 9/2016 | Affatato | A47J 27/04 |
| 2018/0236500 | A1* | 8/2018 | McDonald | A23N 12/023 |
| 2020/0288730 | A1* | 9/2020 | Unger | A22C 17/08 |
| 2021/0386080 | A1* | 12/2021 | McDonald | A47J 27/002 |

* cited by examiner

APPARATUS AND ASSEMBLY FOR THE CLEANING AND COOKING OF SEAFOOD AND CRUSTACEA

RELATED U.S. APPLICATIONS

The present application is a continuation-in-part of U.S. patent application Ser. No. 15/988,651, filed on May 24, 2018 and entitled "Apparatus and Assembly for the Cleaning and Cooking of Seafood and Crustacea", presently pending. U.S. patent application Ser. No. 15/988,651 is a continuation-in-part of U.S. patent application Ser. No. 14/877,519, filed on Oct. 7, 2015, and issuing as U.S. Pat. No. 10,456,812 on Oct. 29, 2019. U.S. patent application Ser. No. 14/877,519 was a continuation-in-part of U.S. patent application Ser. No. 14/812,545, filed on Jul. 29, 2015, and issuing as U.S. Pat. No. 9,408,412 on Aug. 9, 2016. U.S. patent application Ser. No. 14/812,545 was a continuation-in-part of U.S. patent application Ser. No. 14/550,195 filed on Nov. 21, 20174 and issuing as U.S. Pat. No. 9,320,286 on Apr. 26, 2016 and entitled "Apparatus and Method for Cleaning Game".

BACKGROUND OF THE INVENTION

1. Field of the Invention

The present invention relates to the cleaning, washing and cooking of seafood and crustacea. More particularly, the present invention relates to the cleaning and cooking of crawfish. More particularly, the present invention relates to an apparatus that remove debris from the surface of the seafood or crustacea and conveniently allows the cleaned seafood or crustacea to be moved to a boiling pot.

2. Description of Related Art Including Information Disclosed Under 37 CFR 1.97 and 37 CFR 1.98

Seafood boils refer to various types of social events in which shellfish or crustacea are the central elements. Regional variations dictate the kinds of seafoods, the accompaniments and side dishes, and in the preparation techniques (e.g. boiling, steaming, baking, or raw). In some cases, a boil may be sponsored by a community organization as a fundraiser or a mixture. Boils are also held by individuals for their friends and family for weekend get-togethers and summer holidays. There are also companies that can cater a boil for large and small events.

Shrimp, crab and crawfish boils are a Louisiana tradition and can be found across Louisiana and along the Gulf Coast. These shrimp, crab and crawfish boils are becoming more popular in various other areas around the United States and foreign countries. One reason for the popularity of crawfish is the price. Shrimp and crab or higher valued crustacea and may be a less affordable option for larger groups. A boil is usually carried out in a large pot (60 to 80 quarts) fitted with a strainer and heated by propane. Seasonings include crawfish boil packets, cayenne pepper, hot sauce, salt, lemons and bay leaves. Ears of corn, new potatoes, onions, and heads of garlic are usually added in shrimp and crawfish boils. Some people add smoked sausage links or mushrooms. When cooking crawfish, there is a debate over whether or not the crawfish must first be purged by covering them with clear water and a generous amount of salt for a few minutes. Advocates argue that this forces the crawfish to rid their bodies of impurities.

Prior to boiling the crustacea, it is important to clean the crustacea. Typically, the crawfish and shrimp can have debris and impurities on the outer surface thereof. If the crustacea are not cleaned, then this can present a gritty or unpleasant taste following the boil. Typical cleaning preparations, in the past, have been to place a large amount of crawfish into a bucket and then using a hose to spray water over the crawfish in the bucket. After the bucket is filled with water, the bucket is tipped over by hand manipulation so as to remove the debris-containing water. This requires a great deal of manual effort. Additionally, so as to assure that the crawfish and/or shrimp are very clean, this cleaning step must be carried out multiple times. Ultimately, after a suitable amount of cleaning, the crawfish or shrimp will be ready for the boil. During the steps of cleaning, it is quite common for some of the crawfish to escape the cleaning bucket. These crawfish must be manually retrieved and returned for further processing. Many people find that the process of cleaning the crawfish or shrimp is time-consuming and unpleasant. As such, a need has developed so as to be able to efficiently clean the crustacea prior to the step of boiling.

The cooking of many different foods, including vegetables, meats, seafood and crustacea is done by placing the food in a perforated basket, which is, in turn, placed into a larger pot. Typically, the pot contains a volume of liquid, such as water or cooking oil, in which the food within the basket is boiled or fried. Such arrangements have the advantage of permitting cooking of large volumes of individually small pieces of food and readily placing the large volume of food into the pot and removing the same, without the tedious process of scooping out small pieces of food cooked in a large pot. Due to the use of the basket, the entire volume of food may be placed into an removed from the pot at essentially the same time. Another desirable attribute of the basket/pot combination is that the cooking liquid, be it water or cooking oil, that is entrained on, in, at around the food is desirably drained back into the pot after cooking is complete, by suspending the basket over the pot above the liquid level of the pot.

One problem with the baskets and pots that the been used for the cooking of seafood and crustacea is that the pot has a relatively cylindrical wall and the basket has a cylindrical wall. Although the basket may be nested within the pot, common pots cannot be nested within each other because the outer diameters of the cylindrical walls are identical. This is resulted in difficulties in storage, transportation and display of such seafood boiling pots. A significant amount of shelf space is required for each basket/pot arrangement.

In the past, various patents have issued relating to processes for cleaning crustacea, such as crawfish. In particular, U.S. Pat. No. 2,660,754, issued on Dec. 1, 1953 to F. O. Roshko, shows a crawfish picking machine for separating meat from the hulls of crawfish. The picking machine includes a frame having an upper and a lower roller mounting member, upper and lower parallel horizontally disposed rollers mounted one substantially vertically above the other on these members, adjustable tensioning means between the mounting members that yieldably urge the members and the associated rollers together to form a crotch between the rollers, and a drive means operatively connected with the rollers for positively rotating the rollers in opposite directions at a uniform rate. A water jet sprays in front of the crotch substantially parallel with the lower forward peripheral portion of the upper roller and has jet openings directed toward the peripheral portion of the upper roller between the spray and the crotch.

U.S. Pat. No. 2,781,544, issued on Feb. 19, 1957 to T. C. Skarmetta, shows a seafood cleaning machine. This shrimp cleaning machine includes a longitudinally extending generally flat shrimp-receiving platform having flexible, transversely downwardly curved side edges, a support means of which the flexible side edges are entrained, a means operatively connected the platform for transversely reciprocating the platform, longitudinally extending rollers engaging a top surface of the platform adjacent the side edges to form crotches with the platform. The rollers are oscillatably driven by their contact with the top surface of the platform. The surfaces of the rollers and the platform have different coefficients of friction whereby a shrimp received in a crotch will cling to one surface and slip on the other surface to thereby rotate the shrimp until a loose end of the shell is caught between the roller and the platform and the shell is unwound from the shrimp and drawn through the crotch and from the platform.

U.S. Pat. No. 3,958,022, issued on May 18, 1976 to A. Danesh, describes a process for treating seafood. This treatment of seafood allows toxic heavy metal ions to be removed from the seafood so as to make the seafood safe for consumption. The method includes washing the seafood with an organic sulfur complexing agent for heavy metal ions and heating the seafood at a temperature and for a time sufficient to volatilize the heavy metal ions therefrom.

U.S. Pat. No. 7,087,257, issued on Aug. 8, 2006 to Prestenbach, teaches a crustacea and seafood process for preparing fresh uncooked crustaceans, such as crawfish, lobster, crab and shrimp for shipment to consumers in a frozen state. The process includes a washing process. This washing process submerges the crustaceans in a few inches of clean running water. The crustaceans are treated with ozone introduction of a preservative and a bacteriacide while under a vacuum. The crustaceans are spray coated with a seasoning and then quick frozen. They are then packaged in bulk for individualized cook-and-serve containers.

After experiments with the subject matter of the above-identified patents and patent applications to the present inventor, it was found that the cleaning of the seafood or crustacea is accomplished in a very efficient manner. However, in particular with the cleaning of crawfish, the cleaned crawfish would have to be manually moved from the interior of the container and then into the basket and/or boiling pot. This collecting, lifting and movement of the crawfish could become a tedious process. This is particularly the case under those circumstances where at least some of the crawfish remain alive. As such, the present inventor determined that there was a need to allow the cleaned crawfish to be conveniently moved from the cleaning container and into the boiling pot.

U.S. Patent Application Publication No. 2013/0093107, published on Apr. 18, 2013 to R. Funderburg, discloses a fish and game washer that is designed to wash and clean meat. The meat is put into a bucket and a water source is connected thereto. Air is sucked in to mix with water. This causes the meat float up from the bottom and begin to toss and tumble. This takes the loose scales, feathers, blood and debris over the top of the bucket.

U.S. Patent Application Publication No. 2014/0127986, published on May 8, 2014 to W. Cady, describes a cleaning device that uses water pressure to prepare fish and wild game for consumption. A bucket is described having a conduit affixed to a wall thereof. The conduit can be connected to a source of water pressure such that water pressure is directed into the interior of the bucket so as to interact with the game within the interior of the bucket.

U.S. Pat. No. 9,320,286, issued on Apr. 26, 2016 to the present inventor, shows an apparatus and method for cleaning game. This apparatus has a container with an interior volume defined by a wall and a pipe positioned in the container adjacent to the wall. The pipe has at least one aperture suitable for directing a flow of water toward a portion of the wall spaced from the pipe such that the flow of water creates a cyclonic path in the container. The pipe extends generally vertically along the wall of the container. The pipe includes a plurality of apertures formed in spaced relation to each other along the length of the pipe.

U.S. Pat. No. 9,408,412, issued on Aug. 9, 2016 to the present inventor, describes an apparatus and method for cleaning produce. This apparatus has a container with an interior volume defined by a wall in a pipe positioned in the container adjacent the wall. The pipe has at least one aperture suitable for directing a flow of water toward a portion of the wall spaced from the pipe such that the flow of water creates a cyclonic path in the container. The pipe extends generally appropriate vertically along the wall of the container. The pipe includes a plurality of apertures formed in spaced relation to each other along the length of the pipe. The method includes overflowing the container such that the debris on the produce is removed from the produce.

It is an object of the present invention provide an apparatus for cleaning seafood or crustacea that efficiently and effectively separates the debris from the body of the seafood or crustacea.

It is another object of the present invention provide an apparatus for cleaning seafood and crustacea which serves to pressure wash the seafood or crustacea.

It is another object of the present invention to provide an apparatus for cleaning seafood and crustacea that avoids the need to hand wash the seafood or crustacea.

It is still another object of the present invention to provide an apparatus for washing seafood or crustacea that facilitates the ability to clean the container after the washing process.

It is still another object of the present invention to provide an apparatus for the cleaning of seafood and crustacea which avoids the loss of such seafood or crustacea during the washing process.

It is another object of the present invention to provide an apparatus for the cleaning and cooking of seafood or crustacea which allows the crustacea to be easily moved from the cleaning container to the boiling pot.

It is still another object of the present invention to provide an apparatus for the cleaning and cooking of crustacea which allows the cleaning container, the basket and the boiling pot to be easily stacked in a nested relationship.

It is still a further object of the present invention to provide an apparatus for the cleaning and cooking of seafood or crustacea which can be easily stored, transported and displayed.

These and other objects and advantages of the present invention will become apparent from a reading of the attached specification and appended claims.

BRIEF SUMMARY OF THE INVENTION

The present invention is an assembly for cleaning and cooking seafood or crustacea. This assembly comprises a container having an interior volume defined by wall, a basket removably received in the interior of the container, a pipe positioned adjacent to the wall of the container, a connector fluidically connected to the pipe, and a pot spaced from the container. The container has a bottom and an upper edge. The basket has a plurality of openings through a wall of the container. The pipe has a plurality of apertures adapted to direct the flow of water into an interior of the basket. The connector has a portion extending outwardly of the wall of the container. The basket is removably received in the pot.

The wall of the containers tapered such that the upper edge has a diameter greater than diameter of the bottom of the container. The basket has a tapered wall with a taper that generally matches a taper of the tapered wall of the container such that the basket nests in the interior volume of the container. The basket has a slotted configuration overlying the pipe. The plurality of apertures of the pipe are aligned with slots of the slotted configuration of the basket. The plurality of apertures of the pipe are adapted to a direct the flow of water toward a portion of the basket spaced from the pipe such that the flow of water creates a cyclonic path in the basket. The basket is formed of an aluminum material.

The present invention is also an assembly for cleaning seafood or crustacea. This assembly comprises a basket having a plurality of openings through a wall of the basket and a pipe positioned adjacent to the wall of the basket. The pipe directs a flow of water through at least some of the plurality of openings of the basket so as to create a cyclonic path of water flow in an interior of the basket. The basket has an inset area at a portion of the wall of the basket. This area has a plurality of openings corresponding with and aligned with the plurality of apertures of the pipe.

The present invention is also an apparatus for cleaning seafood or crustacea in which the apparatus comprises a container having an interior volume defined by a wall, a pipe positioned in the interior volume of the container and has an aperture adapted to direct the flow of water into the container, and a connector fluidically connected to the pipe. The container has a bottom and an upper edge. The container is adapted to receive the seafood or crustacea therein. The wall of the container is tapered such that the upper edge of the container has a diameter greater than a diameter of the bottom of the container. The connector has a portion extending outwardly of the wall of the container.

The pipe has a plurality of apertures adapted to direct the flow of water toward a portion of the wall of the container spaced from the pipe. The plurality of apertures create a cyclonic flow of water in the container. The pipe is positioned adjacent to the wall of the container. This pipe extends in a generally vertical orientation. This generally vertical orientation is in parallel relation to the wall of the container. The plurality of apertures are formed in spaced relation to each other along a length of the pipe. Each of the plurality of apertures has a slot. The slot has a length substantially greater than a length of the aperture. The pipe has a plurality of spacers extending transversely to a longitudinal axis of the pipe. The plurality of spacers generally abut the wall of the container. Each of the plurality of spacers comprises a fin having an outer edge. One end of the outer edge being radially closer to the pipe than an opposite end of the fin.

In an alternative embodiment, the pipe comprises a nozzle having an outlet directed inwardly of the wall into the interior volume of the container. The nozzle directs the flow of water toward a portion of the container circumferentially spaced from the pipe.

A basket is removably received in the interior volume of the container. This basket has a plurality of openings through a wall thereof. The wall of the container is tapered such that the upper edge has a diameter greater than a diameter of the bottom of the container. The basket has a tapered wall with a taper that generally matches a taper of the tapered wall of the container such that the basket nests in the interior volume of the container.

This foregoing Section is intended describe, with particularity, the preferred embodiments of the present invention. It is understood that modifications to these preferred embodiments can be made within the scope of the appended claims. As such, this Section should not be construed, in any way, as limiting of the broad scope of the present invention. The present invention should only be limited by the following claims and their legal equivalents.

DETAILED DESCRIPTION OF THE INVENTION

Figure 1:
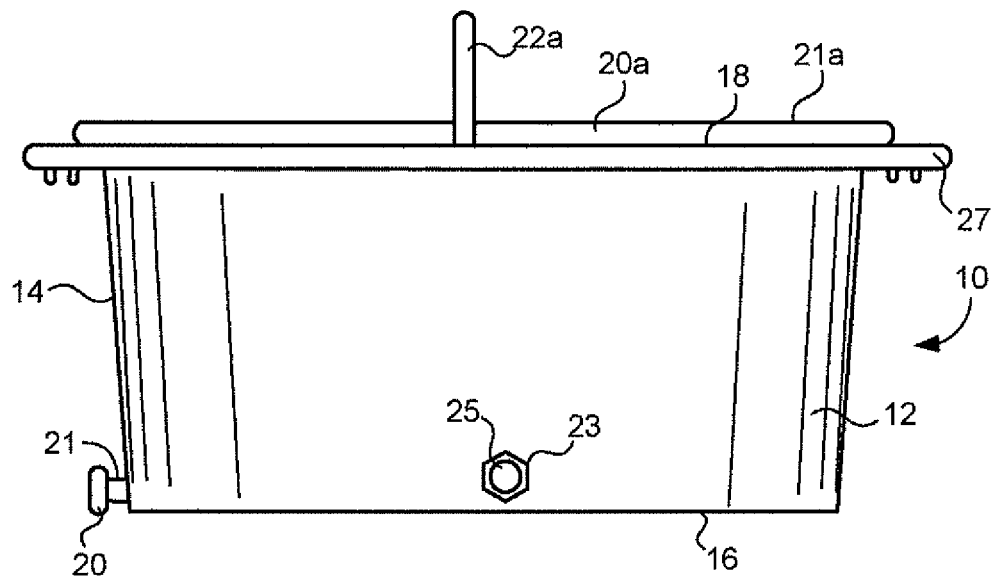
FIG. 1 is a side elevational view of the apparatus for cleaning seafood and crustacea in accordance with the preferred embodiment of the present invention.

Referring to FIG. 1, there shown the apparatus 10 used for the cleaning of crustacea or game in accordance with the present invention. The apparatus 10 includes a container 12 having an interior volume defined by a tapered wall 14. The container 12 has a bottom 16 and an upper edge 18. A pipe, as will be described hereinafter, is positioned adjacent to the wall 14. The pipe will have a plurality of apertures adapted to direct a flow of water toward a portion of the wall spaced from the pipe such that the flow of water creates a cyclonic path in the container. The pipe will extend generally vertically adjacent the tapered wall 14 of the container 12. A connector 20 is fluidically connected to the pipe adjacent a lower end of the pipe. The connector 20 includes a portion 21 that extends outwardly of the wall 14 of the container 12. A drain 23 is affixed through the wall 14 of the container 12 so as to have a portion extending into the interior volume of the container 12. The drain 23 will communicate with the interior volume of the container 12. The drain 23 is positioned adjacent to the bottom 16 of the container 12. The closure 25 can be removably affixed over the open end of the drain 23 so as to block the flow of fluid from or into interior volume of the container 12.

In FIG. 1, it can be seen that the container 12 has a diameter greater than a height of the container 12. For the washing of crawfish and/or seafood, this is particularly important so as to create the desired cyclonic path of water for the proper cleaning of the crawfish or seafood within the interior volume of the container. A lip 27 extends outwardly of the upper edge 18 of the container 12. It can be seen that there is a basket 20a that has its upper edge 21a bearing against the lip 27 of the container 12. As such, this relationship will support the basket 20a within the interior of the container 12. A handle 22a is connected to the basket 20a so as to allow for the proper lifting or lowering of the basket 20a into the container 12. The handle 22a can be pivotally mounted to the upper edge 21a of the basket 20a or it can be fixed thereto. The handle 22a extends upwardly above the upper edge 18 of the container 12. Additionally, within the concept of the present invention, various other configurations of handles can be applied to the basket 20a in order to allow for the proper lifting and lowering of the basket 20a from the container 12. The container 12 has rope-type handles 27a affixed to the lip 27 and extending upwardly therefrom. Handles 27a allow for easy transport and manipulation of the container 12. The handles 27a should be located beyond the outer diameter of the upper edge 21 of the basket 20a.

In FIG. 1, it can be seen that the wall 14 of the container is tapered so as to widen from the bottom 16 toward the upper edge 18. This tapered configuration allows multiple containers 12 to nest within one another. This facilitates the ability to store, ship and display the apparatus 10. The various appliances located on or within the container 12 can be stored at the bottom 16 of the container during shipment. As such, this tapered configuration will allow for a very small amount of space to exist between the bottom of a higher container and the bottom of the lower container. As such, this space can be used to accommodate the various appliances, such as the connector 20, the drain 23, the closure 25 and the pipe.

Figure 2:
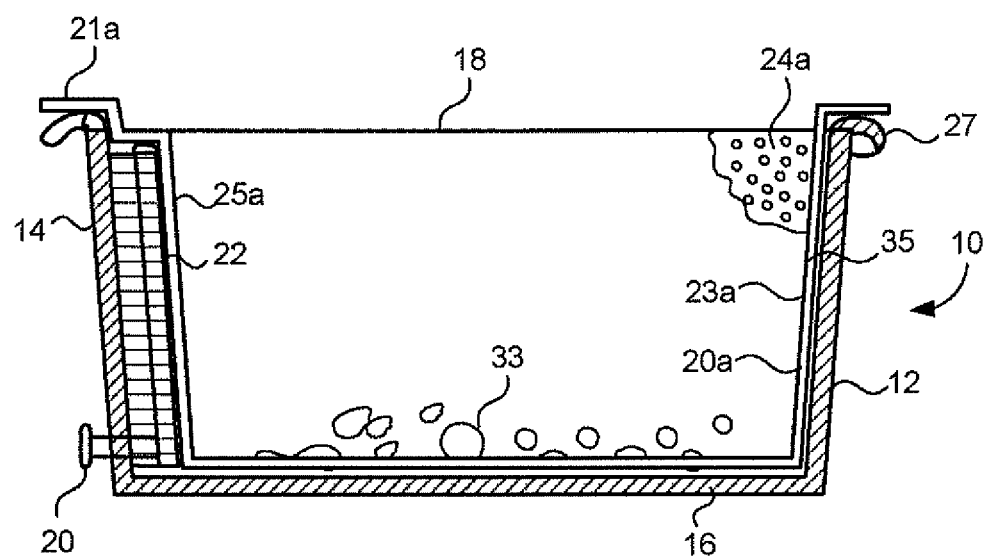
FIG. 2 is a cross-sectional side view showing the apparatus for the cleaning of seafood or crustacea of the present invention and come in particular, showing the basket is located within the interior of the container.

FIG. 2 is a cross-sectional view of the apparatus 10 of the present invention. In FIG. 2, it can be seen that there is a pipe 22 that is positioned adjacent to the wall 14 of the container 12. The pipe 22 has a plurality of apertures adapted to direct a flow of water toward a portion of the wall spaced from the pipe 22 such that the flow of water creates a cyclonic path in the container 12. The pipe 22 extends generally vertically adjacent the wall 14 of the container 12. The connector 20 is illustrated as extending through the wall 14 in fluid-tight relation therewith so as to communicate with the bottom of the pipe 22. As such, when water is introduced through the connector 20 by the use of a water hose, the water will flow upwardly through the pipe 22 and is emitted through the various apertures of the pipe 22. The pipe 22 is illustrated in greater detail in FIGS. 7-12 herein. The lower end of the pipe 22 will be generally adjacent to the bottom 16 of the container 12. The upper end of the pipe 22 will be spaced below the upper edge 18 of the container 12. FIG. 2 further shows that crustacea 33 are received within the interior volume 35 of the container 12.

In FIG. 2, it can be seen that the basket 20a is received within the interior of the container 12. The upper edge or lip 21a of the basket 20a overlies the lip 27 at the upper edge 18 of the container 12. The wall 23a of the basket 20a has an angle of taper generally matching the angle of taper of the wall 14 of the container 12. As such, this will allow the basket 20a to nest within the container 12. A plurality of holes 24a are formed through the wall of the basket 20a so as to allow a fluid within the interior of the basket 20a to drain therefrom.

In FIG. 2, there is an indentation 25a at or adjacent to the pipe 22. This indentation 25a allows the interior of the basket 20a to open to the water as emitted from the pipe 22. Alternatively, the indentation 25a can closely mate with the pipe 22 so that the indentation 25a has holes aligned with the apertures of the pipe 22 so as to allow the force of water emitted from the pipe 22 to be released into the interior of the basket 20a.

Figure 3:
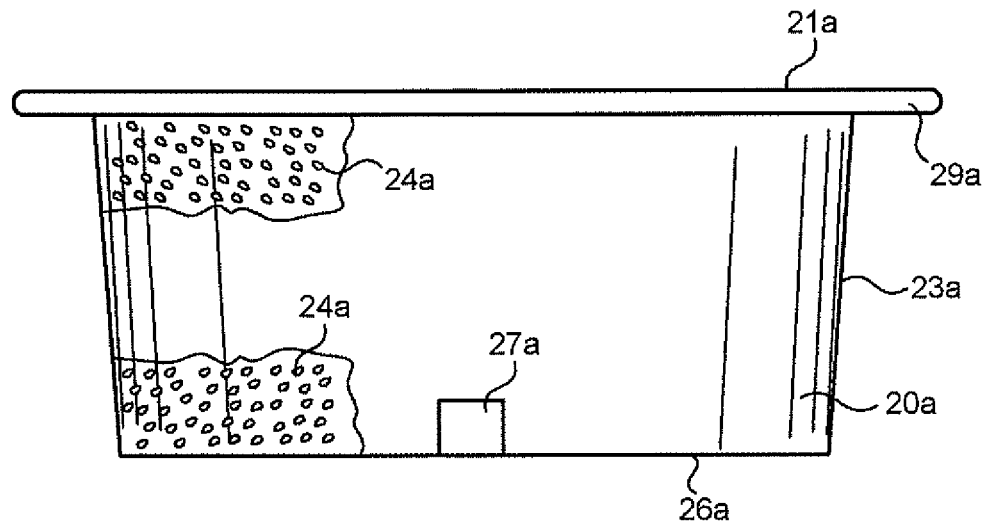
FIG. 3 is a side elevational view showing the basket as used in the apparatus of the present invention.

FIG. 3 is an isolated view showing the basket 20a is used in the present invention. Basket 20a has a wall 23a that has an angle of taper such that the bottom 26a of the basket 20a has a diameter that is less than the diameter of the opening at the upper edge 21a of the basket 20a. A notched area 27a is formed adjacent to the bottom 26a of the basket 20a. Notched area 27a will correspond to the drain 23 of the container 12. As such, the drain 23 can cooperate with this notched area 27a so as to allow fluids to selectively drain therefrom. It can be seen that there are a plurality of holes 24a formed through the wall of the basket 20a. Holes 24a allow the fluid within the interior of the basket 20a to drain therefrom. The upper edge 20a of the basket 28 includes a lip 29a which will serve to overlie the lip 27 of the container 12. The notched area 27a will overlie a portion of the drain 23 that extends into the interior volume of the container 12. The notched area 27a will also include holes therein so that water can flow freely therethrough and into the drain, as desired. As will be described hereinafter, the notched area 27a will be offset by 90° circumferentially from the indentation 25a.

Figure 4:
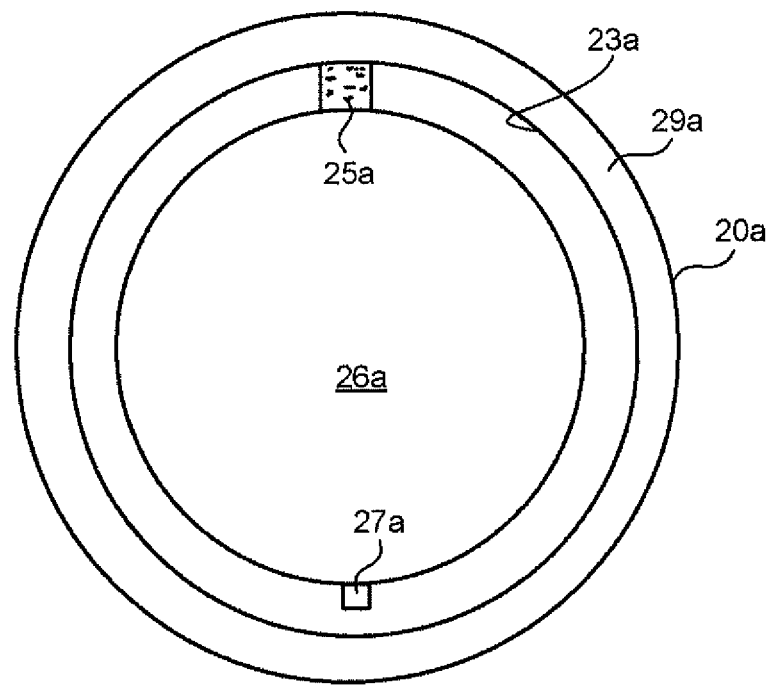
FIG. 4 is a plan view showing the basket as used in the apparatus of the present invention.

FIG. 4 shows a plan view of the basket 20a. Basket 20a includes an outwardly extending lip 29a, an inner wall 23a and a bottom 26a. It can be seen that the wall 23a tapers from the lip 29a inwardly toward the bottom 26a. The indentation 25a formed in the wall 23a of the basket 20a. The notched area 27a is also formed adjacent to the bottom 26a on the wall 23a of the basket 20a.

In FIG. 4, it can be seen that the notched area 27a is offset by approximately 90° circumferentially from the indentation 25a. This configuration will assure proper alignment of the basket with the container. In other words, the indentation 25a will be assured of overlying the pipe 22 when the notched area 27a is placed over the drain 23. As such, the notched area 27a will avoid any improper placement of the basket 20a with respect to the container 12.

Figure 5:
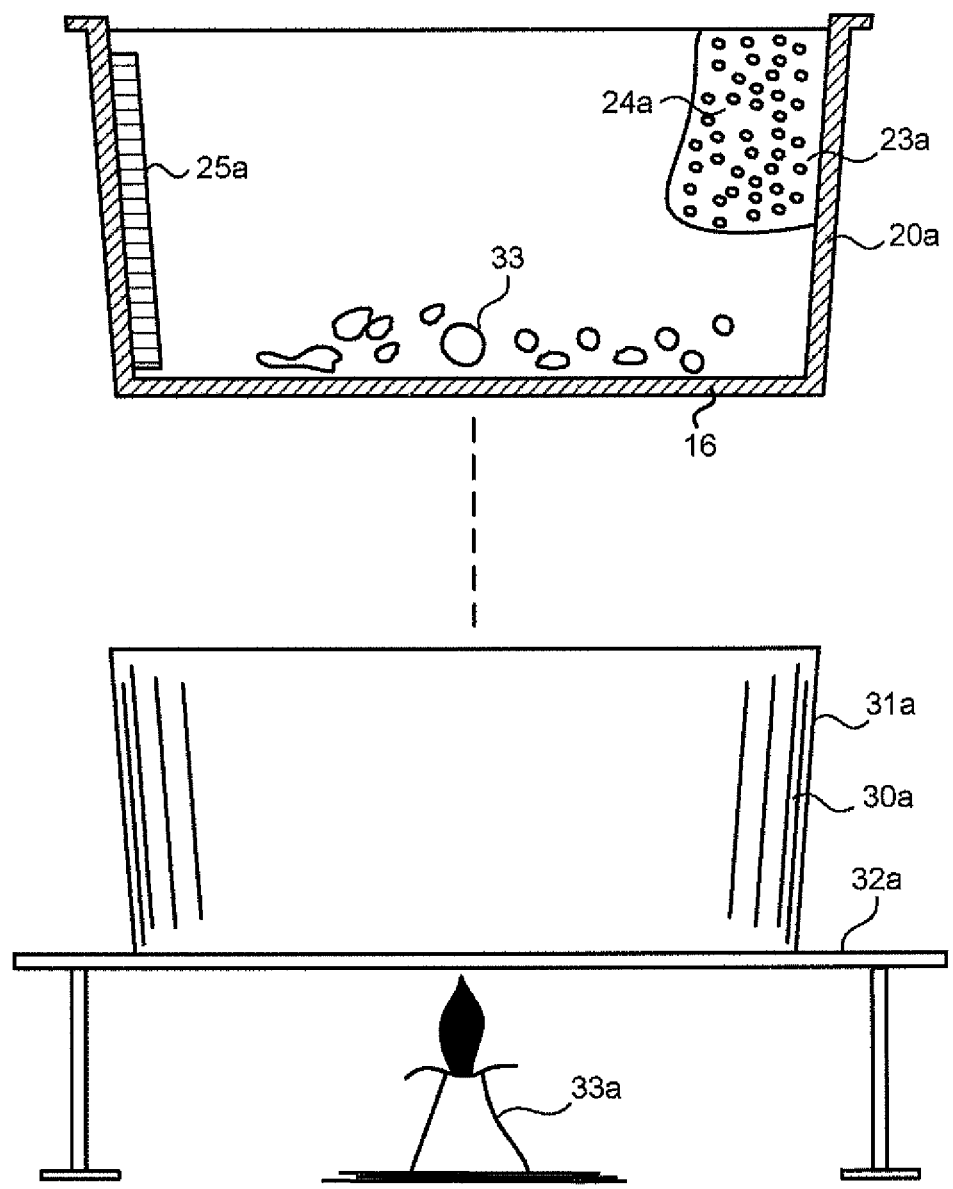
FIG. 5 is a partially cross-sectional view showing the installation of the basket within the boiling pot of the present invention.

FIG. 5 shows how the basket 20a can be removed from the container 12 and repositioned for use within a cooking pot 30a. Cooking pot 30a has a wall 31a that has a taper which matches the taper of the wall 23a of the basket 20a. As such, the basket 20a will nest within the cooking pot 30a when lowered thereinto. The cooking pot 30a can include boiling water therein or other sort of cooking oil so as to facilitate the cooking of the seafood or crustacea 33 within the basket 20a. Openings 24a allows the water or cooking oil to enter the basket 20a for the process of cooking the seafood or crustacea 33.

The cooking pot 30a is supported upon a platform 32a. A source of heat 33a is located beneath the platform 32a so as to elevate the temperature of the cooking oil or water within the cooking pot 30a. As such, the seafood or crustacea 33 can be cooked properly when the basket 20a is lowered into the cooking pot 30a.

With reference to FIG. 5, the present invention allows the basket 20a (which contains the seafood or crustacea 33) to be easily moved from the washing container 12 to the cooking pot 30. As such, the present invention avoids the need to collect the seafood from the bottom of the washing container 12 and physically move the seafood or crustacea into the basket of the cooking pot 30a. As such, the cooking process is greatly improved in speed and efficiency. Also, since the angle of taper of the wall 23a of the basket 20a generally matches the angle of taper of the wall 31a of the cooking pot 30a, a proper nesting relationship is achieved therebetween. A similar nesting arrangement occurs between the cooking basket 20a and the washing container 12. Because of this angle of taper of the wall, each of the components of the cooking process can easily be nested within one another and stacked so as to provide for convenient shipping, storage and display.

In the present invention, the container 12 can be formed of a polymeric material. This polymeric material assures that the container 12 will be relatively inexpensive to manufacture. The basket 20a can be formed of either a polymeric material or a metallic material, such as aluminum. To the extent that the basket 20a is formed of a polymeric material, it will withstand the heat and other forces that are placed upon it by the boiling water within the cooking pot 30. When the basket 20a is formed of a polymeric material, it will be very light and easy to move from the container 12 to the pot 30a. As such, this facilitates the ability to properly clean and wash crustacea or seafood. Additionally, when it is desired to rapidly produce a large number of boiled crawfish, a person can use several baskets 20a throughout the cleaning and boiling process. For example, while the basket 23a is placed in the pot 30a, another basket can be placed within the container 12. As such, the basket and the container will wash the crustacea or seafood while the other basket within the pot 30 will produce the boiled seafood or crustacea. After the boiled seafood or crustacea is released from the basket 20a after removal from the pot 30, the basket 20a can be reloaded with crawfish and returned to the washing process.

Figure 6:
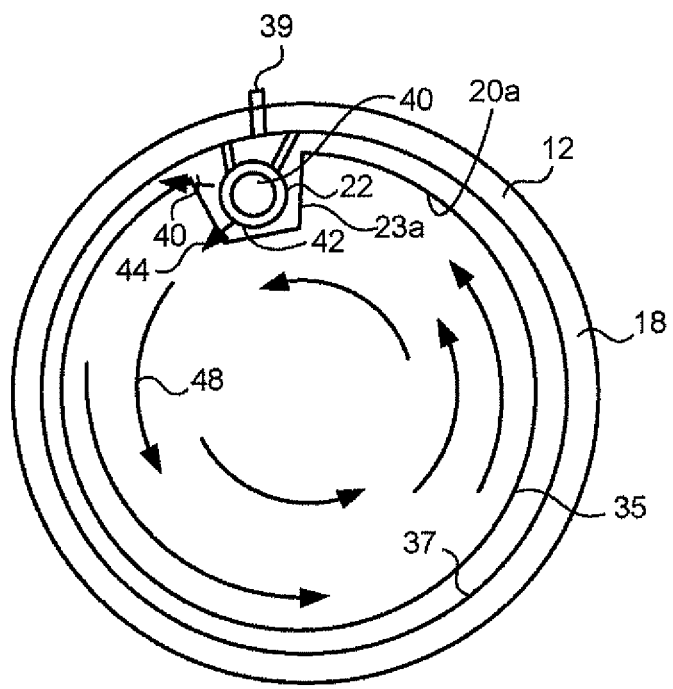
FIG. 6 is a plan view showing the cyclonic flow path of water in the container and the basket of the apparatus of the present invention.

FIG. 6 illustrates a plan view of the container 12 showing the upper edge 18 of the container 12. The container has an inner wall 37 that the that defines the interior volume of the container 12. In FIG. 3, can be seen that the pipe 22 is affixed by fasteners 39 to the inner wall of the container 12. The basket 20a is illustrated as received within the interior volume 35 of the container 12. The basket 20a includes the indentation 23a which extends around the pipe 22.

In FIG. 6, water is directed from the interior 40 of the pipe 22 outwardly through the apertures. As such, the water will flow outwardly of the pipe 22 in a first direction 44 through a first set of apertures and will be directed in a second direction 46 through from a second set of apertures. The water flow 46 is directed toward a portion of the inner wall 37 of the container 12 in spaced relation to the pipe 22. The water flow 44 is directed from the second set of apertures outwardly of the pipe 22 also toward another portion of the inner wall 37 of the container. In particular, the water flow 46 is directed to the portion of the inner wall 37 of the container 12 generally adjacent to the pipe 22. The water flow 44 is directed toward a portion of the inner wall 37 at a location spaced further from the pipe 22 and spaced from the portion of the wall associated with the water flow 46. The direction 46 is generally a chord of a circumference of the container 12. By flowing the water in the first direction, a cyclonic path of water flow (illustrated by arrows 48) is created in the interior volume 35 of the container 12. The cyclonic path of water flow 48 serves to effectively separate the debris from the crustacea or game. The first set of apertures of the pipe 22 will distribute the jets of water over a substantial portion of the height of the container 12. This has been found to enhance the strength of the cyclonic flow path and to create an improved washing effect. The water flow from the second set of apertures of the pipe 22 provides a broader flow which serves to agitate the water within the container 12 further and to pressure wash the crustacea or game within the container 12. As such, the combined water flows 44 and 46 serve to substantially increase the turbulence within the container for the purpose of separating debris from the crustacea or seafood. The water flow 46 creates the cyclonic flow path while the water flow 44 agitates the water flow and pressure washes the crustacea or seafood simultaneously. These water flows combine to enhance the ability of the present invention to effectively clean the crustacea or seafood and to remove the debris therefrom.

FIG. 6 shows that the flow of water passes through the apertures of the pipe 22 and through the holes of the indentation 23. As such, the cyclonic flow of water will flow in the interior of the basket 20a. The combined water flows 44 and 46 serve to substantially increase the turbulence within the basket 20a for the purpose of separating debris from the crustacea or seafood.

Figure 7:
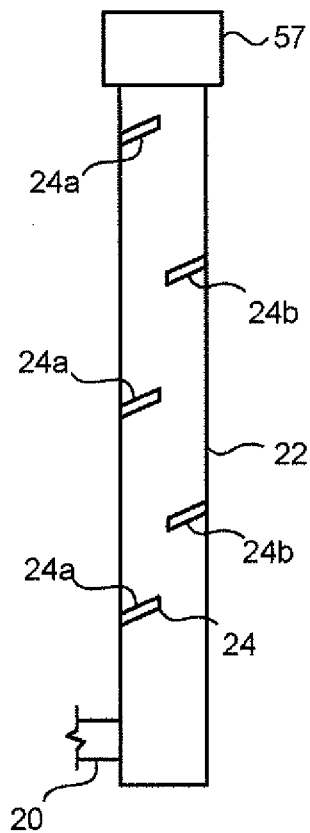
FIG. 7 is a diagrammatic illustration of the apertures that are formed on the pipe of the apparatus the present invention.

FIG. 7 illustrates the configuration of the pipe 22. It can be seen that the apertures 24 are formed through the wall thickness of the pipe 22. A closure 51 is located at the top of the pipe 22 so as to effectively close the top of the pipe. The connector 20 is located at the bottom of the pipe 22 so as to allow the introduction of water into the interior 40 of the pipe 22. Within the concept of the present invention, the connector 20 can be at any location along the length of the pipe 22.

Within the concept of the present invention, the pipe can include a nozzle having an outlet inwardly of the wall of the container toward the interior of the container. The nozzle directs the flow of water toward a portion of the container circumferentially spaced from the pipe. As such, unlike the previous embodiment showing a plurality of apertures, this embodiment has a single nozzle that directs a strong flow of water so as to create the cyclonic flow of water effect and to effectively separate dirt and debris from the crawfish within the container.

In FIG. 7, it can be seen that each of the apertures 24 includes a slot. The apertures 24 are positioned in generally spaced parallel relation to each other along the length of the pipe 22. A first set of apertures 24a will extend in one direction along a portion of the pipe 22 generally adjacent to the wall 16 of the container 12. A second set of apertures 24b are positioned on the pipe 22 away from the first set of apertures 24a. The second set of apertures 24b are directed further away from the wall of the container 12 than the apertures 24a. In the preferred embodiment of the present invention, there are a total of three apertures 24a and two apertures 24b. The apertures 24b are interposed longitudinally between the adjacent pairs of the apertures 24a. As such, this is configured to establish a broad fan-style spray of water flow from the pipe 22. It can be seen that each of the first set of apertures 24*a* and the second set of apertures 24*b* are canted at an approximately 30° angle to horizontal. Once again, this angled relationship of each of the apertures 24*a* and 24*b* is configured so as to create the optimal cyclonic water flow path and pressure washing. This slotted type of aperture 24, as opposed to holes or other type of openings, is intended to create a fan of water as it is ejected under pressure from each of the apertures 24. However, within the concept of the present invention, the apertures 24 can include holes, openings, and similar techniques for releasing the water under pressure from the pipe 22. Additionally, spray-type fittings could be placed within holes formed in the pipe 22. It is believed that the fan-shape flow of water greatly facilitates the pressure washing of the crustacea or game and enhances the creation of the cyclonic path of water flow. Additionally, such a fan-type spray further serves to distribute the pressurized water over a greater area than would be the release of water through the use of a simple circular hole pattern.

Figure 8:
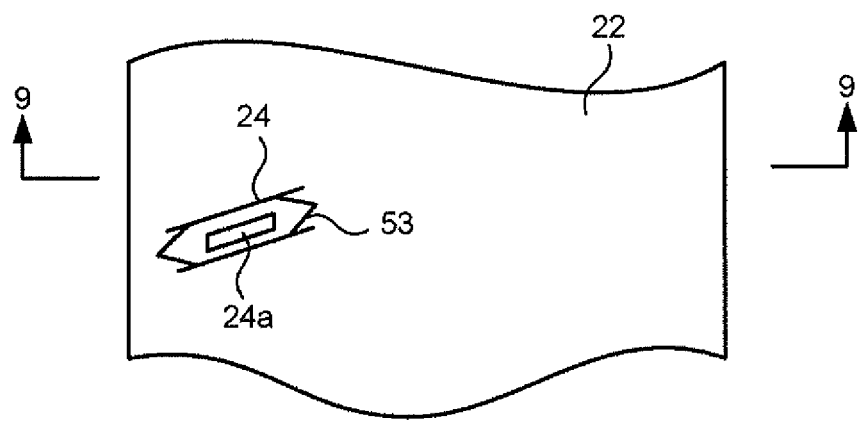
FIG. 8 is a detailed view showing the construction of an aperture on the pipe of the apparatus the present invention.
Figure 9:
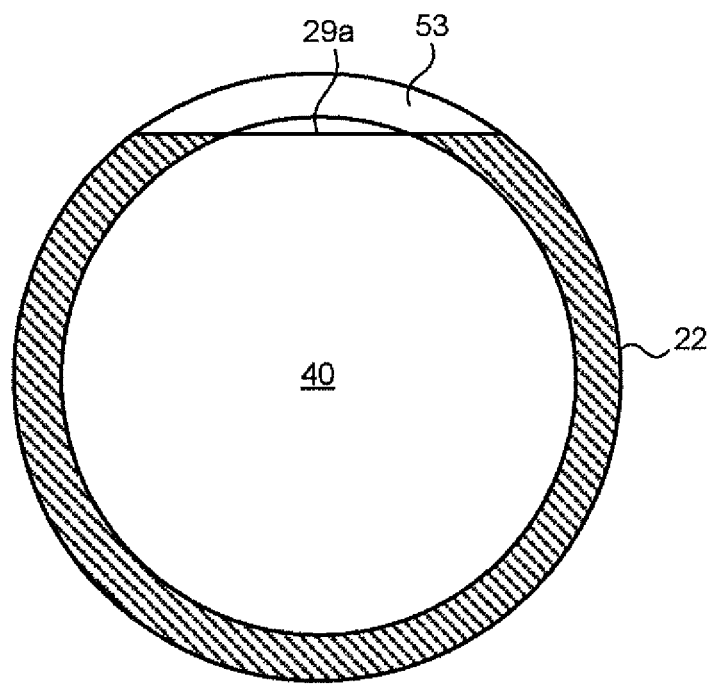
FIG. 9 is a cross-sectional view of the pipe is taken across lines 9-9 of FIG. 8.

FIG. 8 illustrates the construction of a single aperture 24. In particular, aperture 24*a* is shown as located within a slot 53. The slot 53 has a generally oval configuration with a widened central area and narrowing ends. In experiments with the present invention, it is found that the apertures 24 can be made in a rapid, efficient and effective manner by simply using a saw set to cut the pipe 22. The saw can be set so as to cut the slot 53 to a prescribed depth. Since the pipe 22 has a known wall thickness, the slot 53 is cut through the wall thickness so as to expose the aperture 24*a*. The aperture 24*a* is exposed so as to have a greater length than width. It can be seen that the aperture 24*a* is of an elongated nature. As such, this will cause a fan-type spray pattern. Additionally, the inner walls of the slot 53 will constrain the release of water into such a fan-type pattern and also, through the use of fluid dynamics, enhance the force of the water as it is emitted through the aperture 24*a*. It can further be seen that the slot 53 has a greater length and greater width than that of the aperture 24*a*.

FIG. 8 further shows that the slot 53 has been cut so as to be canted at an approximately 30° angle with respect to horizontal. Once again, this angling of the aperture 24*a* and its slot 53 further enhances the wide-area spray-type flow pattern. Apertures 24*b* will have a similar configuration to aperture 24*a*.

FIG. 8 illustrates the construction of the slot 53 and the aperture 24*a* in a view taken across lines 9-9 of FIG. 8. As can be seen, the slot 53 is simply formed by cutting through the pipe 22 with a chop saw. As such, a relatively linear aperture 24*a* is formed when the depth of the cut enters into the interior 40 of the pipe 22. As a result, water can be released through the aperture 24*a* and be restrained the directed by the wall created by the formation of the slot 53.

Figure 10:
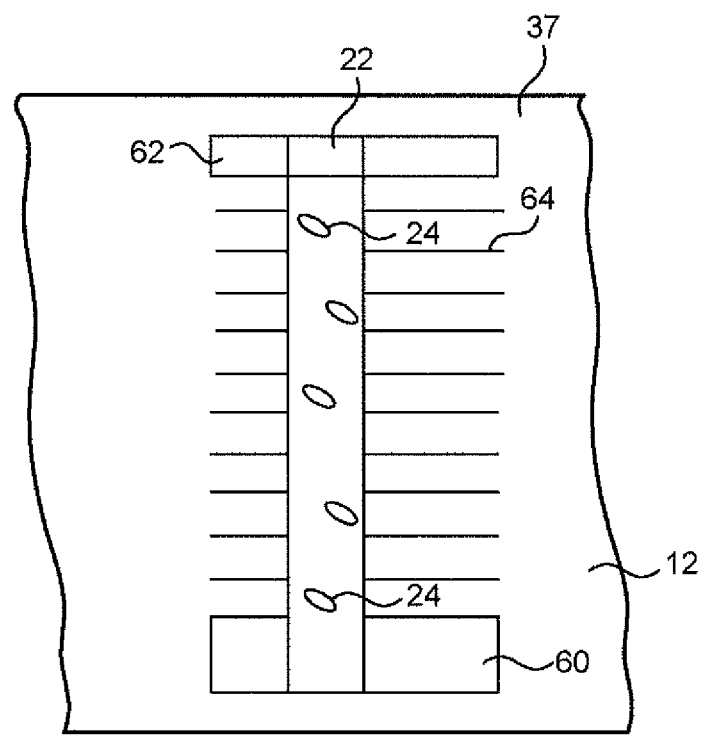
FIG. 10 is a frontal view of the pipe within the container of the apparatus of the present invention.

FIG. 10 particularly illustrates the configuration of the pipe 22 as positioned against the inner wall 37 of the container 12. It can be seen that the pipe 22 includes apertures 24 arranged in the manner described herein previously. There is a lower portion 60 that is positioned adjacent to the inner wall 37 and an upper portion 62 positioned against the inner wall 37. Portions 60 and 62 are at opposite ends of the pipe 22. A plurality of spacers 64 extend outwardly of the pipe 22 and, as will be described hereinafter, serve to bear against the inner wall 37 of the container 12. Importantly, in view of the flow of water emitted from the apertures 24, a cyclonic path of water flow will occur within the container 12. As such, under certain circumstances, would be possible for the crustacea or game to become wedged between the surfaces of the pipe 22 and the inner wall 37 of the container 12. The spacers 64, which are in the nature of fins, serve to convey the crustacea or game in a direction over and away from the pipe 22. As such, this avoids any possible lodging of the crustacea or game between the inner wall 37 and the pipe 22 which could serve to impede the water flow from the apertures 24. these spacers or fins also serve to create a desirable laminar flow patterns of the cyclonic flow of water within the container.

Figure 11:
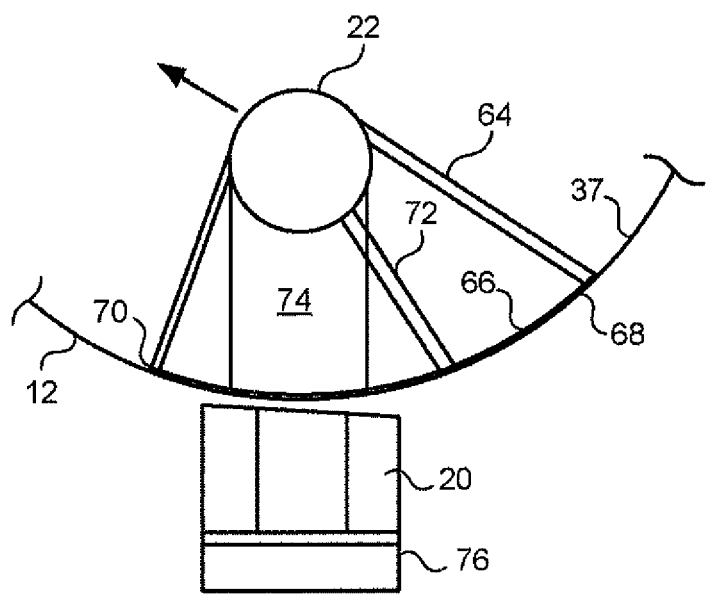
FIG. 11 is a bottom view of the pipe is positioned against the wall of the container of the apparatus of the present invention.

FIG. 11 illustrates the end view of the pipe 22 as positioned against the inner wall 37 of the container 12. It can be seen that the spacers 64 has a fan-shape configuration so as to extend to an outer edge 66. One end 68 of the outer edge 66 is spaced further from the pipe 22 than the opposite end 70 of the spacers 64. A rib 72 extends across the spacers 64 so as to enhance the structural stability of the spacer. A conduit 74 extends from the pipe 22. Conduit 74 communicates with the interior of the pipe 22. The connector 20 is affixed to the conduit 74 so as to extend outwardly of the container 12. The connector 20 has a fitting 76 thereon which can reserve to receive a water hose. As such, this allows water to be introduced into the interior of the pipe 22.

Figure 12:
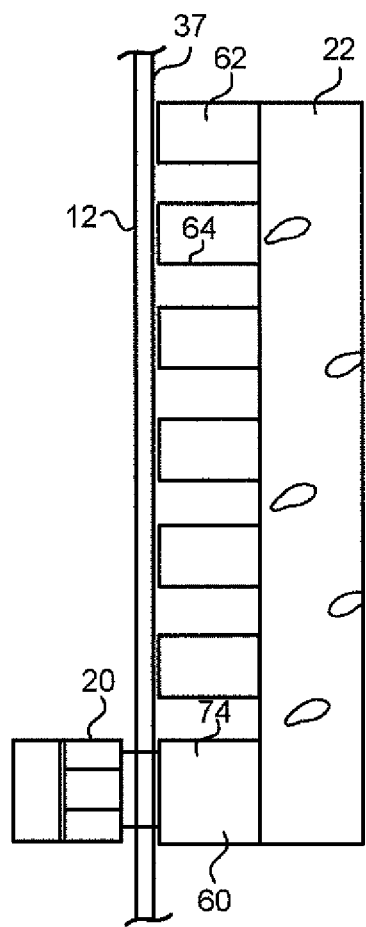
FIG. 12 is a side elevational view showing the placement of the pipe of the present invention against the wall of the container of the apparatus of the present invention.

FIG. 12 further illustrates how the pipe 22 is supported against the inner wall 37 of the container 12 through the use of the spacers 64. The upper portion 62 of the pipe 22 has an end that abuts the inner wall 37 of the container 12. The lower portion 60 will abut a lower portion of the inner wall 37. Spacer 64 extends in parallel relationship between the upper portion 62 and the lower portion 60. The lower portion 60 defines the conduit 74 which extends from connector 20 to the interior of the pipe 22.

Figure 13:
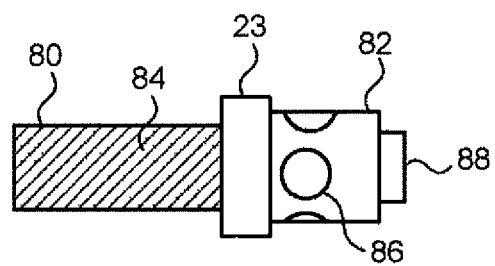
FIG. 13 is a side elevational view showing the drain as used on the container of the apparatus of the present invention.

FIG. 13 illustrates the drain 23 that is used on the container 12. The drain 23 has a first end 80 and a second end 82. The first end 80 has threads 84 thereon. Threads 84 are adapted to accommodate the threaded fitting of a water hose. As such, if it is desired to cause the draining of the container 12 to a remote location, a water hose can be connected to the drain 23 at the first end 80 and then draped to a desired location for disposing of the water. As an example, if the user does not wish to drain the container 12 on a patio or driveway, a hose can be connected to the threaded connection 84 and moved so that the water can be released of into a sewer system, a lawn, a body of water, or other location.

It can be seen that the second end 82 will be located within the interior 35 of the container 12. The second end 82 includes a plurality of openings 86 formed therethrough. The plurality of openings 86 will open to an interior passageway extending through the drain 23. Another opening 88 can be located at the end of the interior passageway of the drain 23. If any of the openings 86 and 88 should become clogged, the drain can still properly operate through the use of the other openings.

Importantly, the drain 23 is particularly adapted to allow the user to clean the interior of the container after use. After the debris is been removed from the crustacea or seafood, a certain amount of the debris will drift to the bottom of the container and reside thereon. The drain 23 can be used so as to drain the water from the container in a desired manner. Furthermore, the drain 23 can also be utilized so as to allow for water to be introduced into the container so as to clean the interior of the container. For example, a water hose can be connected to the threaded fitting 84 at the first and 80 so as to introduce water, under pressure, through the drain 23 and through the openings 86 and 88. As such, the present invention facilitates the proper cleaning of the interior of the container.

Figure 14:
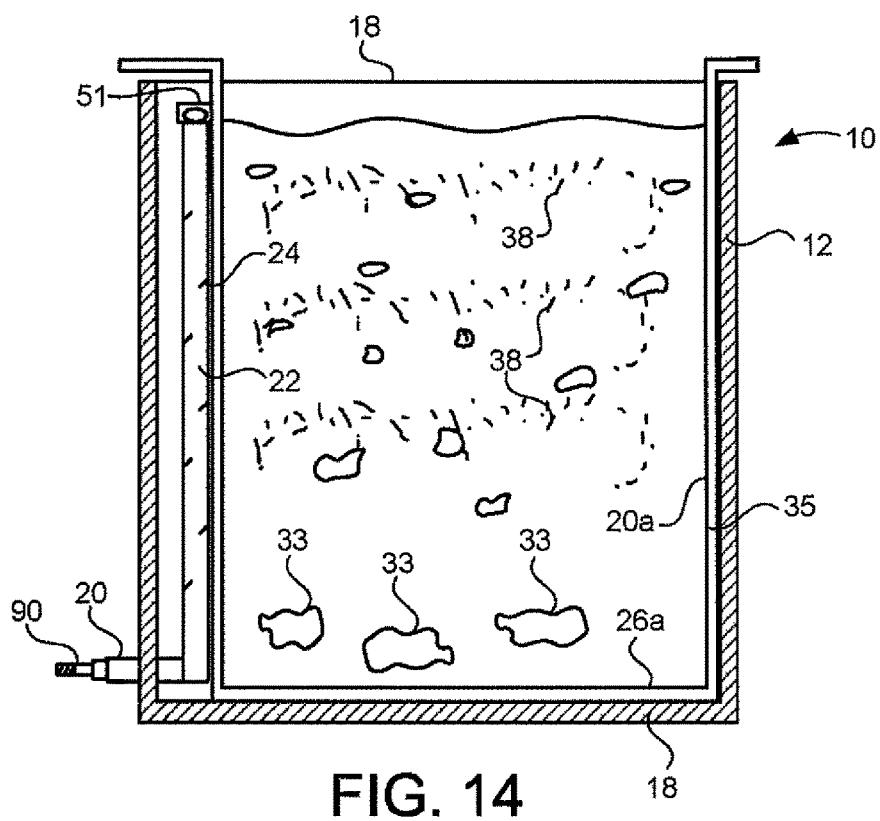
FIG. 14 is illustration of the method the present invention is used for the cleaning of seafood or crustacea.

FIG. 14 shows a step in the cleaning of crustacea or seafood in accordance with the present invention. In FIG. 14, the apparatus 10 includes the container 12, the basket 20*a* and the pipe 22 in the manner described herein previously. A garden hose 90 is connected to the connector 20. As such, the water hose 90 can deliver water under pressure through the connector 20 and into the interior of the pipe 22. In FIG. 14, it can be seen that the pipe 22 includes the closure 51 at an upper end thereof. Ultimately, the upper end of the pipe 22 should be disposed below the upper edge 18 of the container 12 or basket 20*a*. When the cyclonic water path is created in the manner described herein previously, the extension of the pipe 22 above the upper edge 18 would restrict the dispersion of the debris and release the debris. In other words, the cyclonic path of the flow of the debris would encounter the upper end of the pipe 22 and tend to clump and gather in such an area. As such, within the concept of the present invention, the upper end of the pipe 22 should be disposed at a certain distance below the upper edge 18 of the container 12.

In FIG. 14, water has been introduced through the apertures 24 of the pipe 22 and into the interior 35 of the container 12 and into the interior of the basket 20*a*. The introduction of the water in the cyclonic flow path illustrated in FIG. 6 causes the crustacea or seafood 33 to generally tumble in the area adjacent to the bottom 16 of the container 12 and the bottom 26*a* of the basket 20*a*. The fan-type flow of water from the pipe 22 will serve to pressure-wash the tumbling crustacea or seafood 33. Additionally, the debris 38, in the nature of dirt, mud, blood, or the like, will tend to move upwardly toward the upper edge 18 of the container 12. This is because the debris 38 is generally less dense than water and less dense than the crustacea or seafood 33. The cyclonic flow of water within the container 12 also serves to urge the debris 38 upwardly. The continual flow of water into the interior 35 of the container 12 will continually dilute the debris within the container. As such, the debris will mix with the water and be discharged in the manner shown in FIG. 15.

Figure 15:
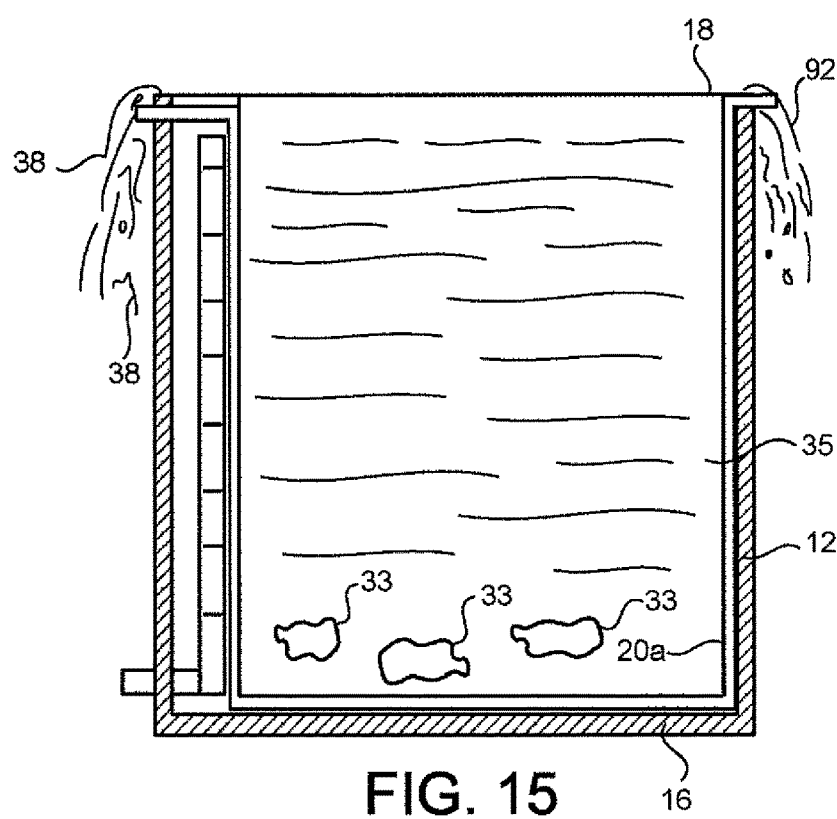
FIG. 15 is an illustration of a further step of the present invention as used in the cleaning of seafood or crustacea.

In FIG. 15, it can be seen that after a certain amount of time, the seafood or crustacea 33 will reside adjacent to the bottom 16 of the container 12. The water 92 from the interior 35 of the container 12 overflows the upper edge 18 of the container 12. This overflow will serve to discharge the debris 38 outwardly of the container 12. Ultimately, after period of time, the debris from the crustacea or seafood will continue to dilute until only clear water resides within the interior 35 of the container 12. After the debris 38 has been discharged over the upper edge 18 of the container 12, and after the water has become sufficiently clear, the water flow can be turned off and the crustacea or seafood 33 removed from the interior 35 of the container 12. In other words, the basket 20*a* is lifted from the container with all of the crustacea or seafood therein wasted and cleaned. The crustacea or seafood will be very clean and suitable for use without further treatment. As such, when crawfish is the crustacea used in the system of the present invention, the crawfish will be almost polished completely clean. As such, the basket 20*a* can be passed for boiling in the boiling pot during the crawfish boil. As such, the system of the present invention avoids the requirement for meticulously manually washing the crustacea or game. There is no need to fill buckets with crawfish and then use a water hose with the bucket in order to spray the crawfish and further dump the bucket after several sprayings. The present invention allows the crustacea or game to be cleaned in a relatively short period of time.

Figure 16:
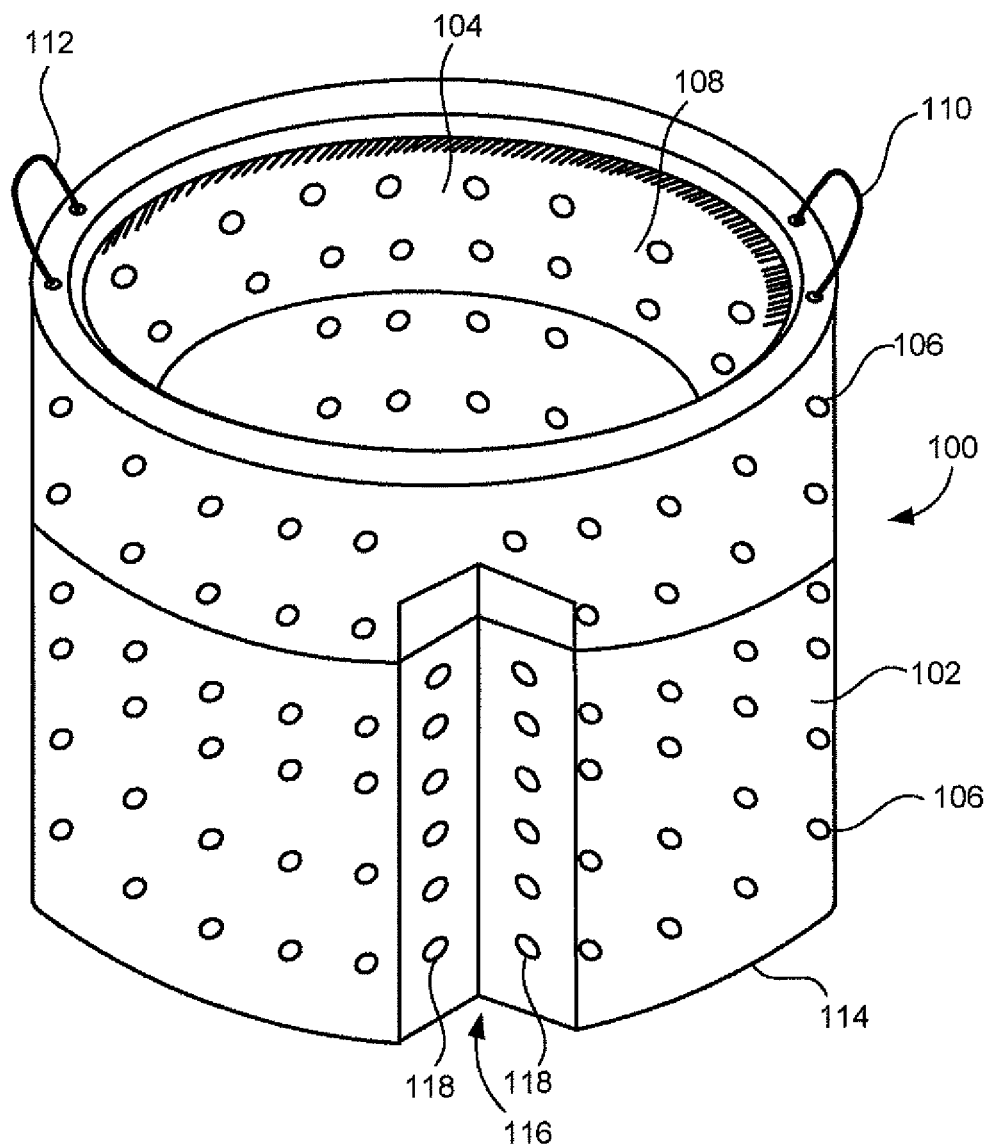
FIG. 16 is a perspective view of the basket as used for the cleaning of seafood or crustacea.

FIG. 16 shows an isolated view of the basket 100 in accordance with the teachings of the present invention. The basket 100 has a wall 102 and an interior volume 104. A plurality of holes 106 are formed through the wall 102 of the basket 100. Holes 106 allow water to communicate between the exterior and the interior of the basket 100. The basket 100 has a rim 108. A handle can be incorporated onto the basket 100 in the manner shown in FIG. 1. The handle can be attached to the upper rim 115 and extend outwardly therefrom. The handle can be pivotally mounted to the upper rim 15 so as to be movable between a horizontal orientation and a vertical orientation. In the vertical orientation, the handle would extend upwardly above the rim 115. The handle allows a user to lift the basket 100 from the interior of the container, the place the basket 100 into the boiling pot, to lift the basket from the boiling pot, and return the basket back into the container for washing.

In FIG. 16, it can be seen that the wall 102 has a taper such that the bottom 114 has a smaller diameter than the rim 108. The taper of the wall 102 allows the basket 10 to nest within the interior of the container and also nest within the interior of the boiling pot. The wall 102 should be formed of a polymeric material or metallic material, such as aluminum. As such, the basket 110 can be used for both the cleaning of the seafood or crustacea, the movement of the seafood and crustacea from the container to the boiling pot, and the insertion of the basket 100 into the boiling pot. The cleaning basket is the same as the boiling basket. When the basket 100 is lifted from the cleaning container, the water on the interior 104 of the basket 100 will drain through the openings 106. The size of the openings 106 will avoid any release or escape of the seafood or crustacea.

In the present invention, it is important that the flow of water from the apertures of the pipe be directed into the interior 104 of basket 100. As such, basket 100 has an indentation 116 formed in the wall 102. Indentation 116 will conform to the exterior of the pipe. The indentation 106 includes a plurality of holes 118 which will correspond and align with the apertures of the pipe. As such, when the apertures of the pipe direct the flow of water, this flow of water is directed immediately into the interior 104 of the basket 100. The configuration of the holes 118 will not interfere with a distribution of water from the apertures of the pipe. Additionally, if necessary, the pipe can actually be affixed within the indentation 116 so as to direct the flow of water directly into the basket 104 without the use of the separate washing container.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

I claim:

1. An assembly for cleaning and cooking seafood or crustacea, the assembly comprising:
   a container having an interior volume defined by a wall, said container having a bottom and an upper edge;
   a basket removably received in said interior volume of said container, said basket having a plurality of openings in a wall thereof;
   a pipe positioned adjacent to said wall, said pipe having a plurality of apertures adapted to direct the flow of water into an interior of said basket;

a connector fluidically connected to said pipe, said connector having a portion extending outwardly of said wall of said container; and a pot spaced from said container, said basket being removably received in said pot.

2. The assembly of claim 1, said wall of said container being tapered such that the upper edge has a diameter greater than a diameter of said body of the bottom of said container, said basket having a tapered wall with a taper that generally matches a taper of the tapered wall of said container such that said basket nests in the interior volume of said container.

3. The assembly of claim 2, said basket having a slotted configuration overlying said pipe, said plurality of apertures of said pipe being aligned with slots of the slotted configuration of said basket.

4. The assembly of claim 1, said basket being formed of an aluminum material.

5. The assembly of claim 1, said plurality of apertures of said pipe adapted to direct the flow of water toward a portion of said basket spaced from said pipe such that flow of water creates a cyclonic path in said basket.

\* \* \* \* \*